(12) United States Patent
Chang et al.

(10) Patent No.: US 8,473,711 B2
(45) Date of Patent: Jun. 25, 2013

(54) APPARATUS FOR PREDICTING MEMORY ACCESS AND METHOD THEREOF

(75) Inventors: Yu-Ming Chang, Taipei County (TW); Yen-Ju Lu, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 488 days.

(21) Appl. No.: 12/349,477

(22) Filed: Jan. 6, 2009

(65) Prior Publication Data

US 2009/0198923 A1 Aug. 6, 2009

(30) Foreign Application Priority Data

Jan. 7, 2008 (TW) .............................. 97100563 A (51) Int. Cl.
*G06F 12/00* (2006.01)
(52) U.S. Cl.
USPC .......................................... 711/204; 711/140
(58) Field of Classification Search
USPC ......................................................... 711/204
See application file for complete search history.

(56) References Cited

U.S. PATENT DOCUMENTS

| | | | |
|---|---|---|---|
| 6,266,752 B1* | 7/2001 | Witt et al. ...................... | 711/200 |
| 6,516,389 B1* | 2/2003 | Uchihori ....................... | 711/137 |
| 7,099,913 B1* | 8/2006 | Bertone et al. ................ | 709/202 |
| 7,363,435 B1* | 4/2008 | Stenstrom ...................... | 711/147 |
| 2003/0079088 A1* | 4/2003 | Malik ........................... | 711/137 |
| 2003/0101326 A1* | 5/2003 | Fallah et al. ................... | 711/204 |
| 2003/0154351 A1* | 8/2003 | Nilsson et al. ................ | 711/141 |
| 2004/0064663 A1* | 4/2004 | Grisenthwaite ............... | 711/169 |
| 2004/0243764 A1* | 12/2004 | Miller ........................... | 711/118 |
| 2005/0010740 A1* | 1/2005 | Wong et al. ................... | 711/213 |
| 2006/0047913 A1* | 3/2006 | Bigelow et al. ............... | 711/137 |
| 2006/0184752 A1* | 8/2006 | Takano ......................... | 711/154 |
| 2007/0277025 A1 | 11/2007 | Altman | |
| 2009/0198923 A1* | 8/2009 | Chang et al. .................. | 711/154 |

* cited by examiner

*Primary Examiner* — Kaushikkumar Patel
(74) *Attorney, Agent, or Firm* — McClure, Qualey & Rodack, LLP (57) ABSTRACT

A method for predicting memory access, where each data processing procedure is performed in a plurality of stages with segment processing, and the plurality of stages include at least a first stage and a second stage, includes: dividing a memory into a plurality of memory blocks, generating a predicting value of a second position information according to a correct value of a first position information at the first stage, accessing the memory blocks of the corresponding position in the memory according to the predicting value of the second position information, and identifying whether the predicting value of the second position information is correct or not for determining whether the memory is re-accessed, where the first stage occurs before the second stage in a same data processing procedure.

18 Claims, 12 Drawing Sheets

|  | Time 1 | Time 2 | Time 3 | Time 4 | Time 5 | ⋯ |
|---|---|---|---|---|---|---|
| First task | I | D | E | M | W | ⋯ |
| Second task |  | I | D | E | M | ⋯ |
| Third task |  |  | I | D | E | ⋯ |
| Fourth task |  |  |  | I | D | ⋯ |
| Fifth task |  |  |  |  | I | ⋯ |

FIG. 5

| Access times | AHQ | The physical address of the memory block PHY_ADD_NEXT | The prediction value of the physical address of the memory block PHY_ADD_NEXT_PREDICTION | The procedure of the prediction table |
|---|---|---|---|---|
| 501 — 1 | 00 00 00 | 00 | 00 | Hit. Set the prediction value to be 00 |
| 502 — 2 | 00 00 00 | 00 | 01 | Miss. Set the prediction value to be 01 |
| 503 — 3 | 01 00 00 | 00 | 11 | Miss. Set the prediction value to be 11 |
| 504 — 4 | 11 01 00 | 00 | 00 | Hit. Set the prediction value to be 00 |
| 5 | 00 11 01 | 00 | 01 | Miss. Set the prediction value to be 01 |
| 6 | 01 00 11 | 00 | 11 | Miss. Set the prediction value to be 11 |
| 7 | 11 01 00 | 00 | 00 | Miss, unchange |
| 505 — 8 | 00 11 01 | 01 | 01 | HIT |
| 9 | 01 00 11 | 11 | 11 | HIT |
| 10 | 11 01 00 | 00 | 00 | HIT |
| 11 | 00 11 01 | 01 | 01 | HIT |

APPARATUS FOR PREDICTING MEMORY ACCESS AND METHOD THEREOF

BACKGROUND OF THE INVENTION

1. Field of the Invention

The present invention relates to a memory access mechanism, and more particularly, to a method and apparatus for predicting memory access.

2. Description of the Prior Art

Figure 1:
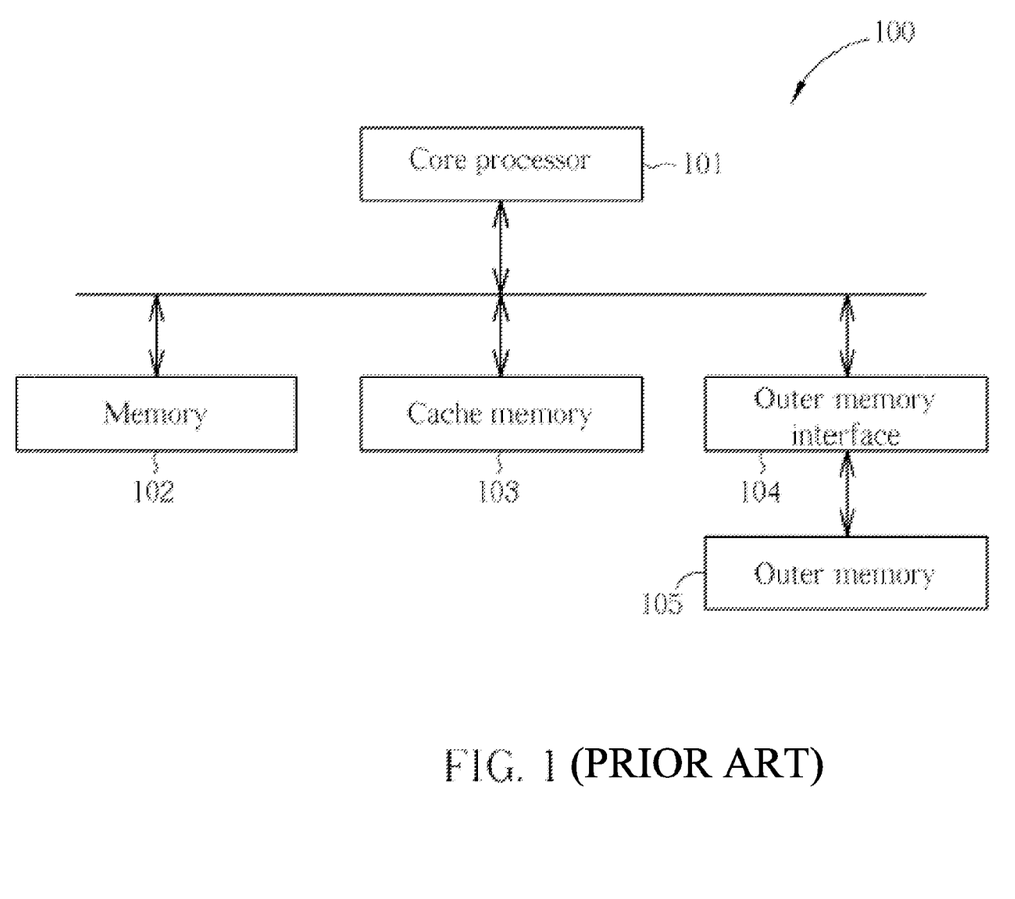
FIG. 1 is a diagram of a prior art data processing system.

FIG. 1 is a diagram of a prior art data processing system 10. As shown in FIG. 1, the data processing system 10 comprises a core processor 101, a memory 102, a cache memory 103, an outer memory interface 104 and an outer memory 105. The core processor 101 is for processing calculation information; the memory 102 is coupled to the core processor 101, and is for storing instructions or data that needs to be processed by the core processor 101; the cache memory 103 is a memory apparatus of low storage capacity but high access speed, and is also coupled to the core processor 101 for temporarily storing instructions or data that needs to be processed by the core processor 101; the outer memory interface 104 is coupled to the core processor 101, for being the communication channel of the outer memory 105 and internal components; and the outer memory 105 is coupled to the outer memory interface 104, and is a memory apparatus of high storage capacity but low access speed.

Generally speaking, the core processor 101 first retrieves instructions and data from the cache memory 103. When the required instructions and data are unable to be found in the cache memory 103, the core processor 101 retrieves the instructions and data from the memory 102. Similarly, when the required instructions and data are unable to be found in the memory 102, the core processor 101 retrieves the instructions and data from the outer memory 105.

Within the procedure of retrieving instructions and data, a memory management unit (MMU) and an address calculation unit (not illustrated in FIG. 1) are set depending on the needs of the system, where the address calculation unit generates a virtual address/logic address according to the tasks of the system, and the MMU is for converting the virtual address/logic address to a physical address, and then searching the overall memory according to the physical address to retrieve the required instructions or data.

The procedure of searching instructions and data from layers of memories is not only time consuming, but also power consuming, and significantly reduces the overall efficiency and performance of the system. Therefore, how to improve the access efficiency of the memory and also reduce the power consumption are important topics to be considered.

SUMMARY OF THE INVENTION

Accordingly, it is therefore one of the objectives of the present invention to provide a method and apparatus of predicting memory access in order to solve the problems faced by the conventional art, in order to improve the prediction accuracy and reduce the power consumption of the memory system.

According to an embodiment of the present invention, a method of predicting memory access is disclosed, where each data processing procedure is performed in a plurality of stages with segment processing, and the plurality of stages comprises at least a first stage and a second stage. The method comprises: dividing a memory into a plurality of memory blocks; generating a predicting value of a second position information according to a correct value of a first position information at the first stage; accessing the memory blocks of the corresponding position in the memory according to the predicting value of the second position information; and identifying whether the predicting value of the second position information is correct or not for determining whether the memory is re-accessed; where the first stage occurs before the second stage in a same data processing procedure.

According to another embodiment, the present invention discloses an apparatus for predicting memory access, where each data processing procedure is performed in a plurality of stages with segment processing, and the plurality of stages comprises at least a first stage and a second stage. The apparatus comprises: a memory, comprising a plurality of memory blocks; a prediction unit, coupled to the memory, for generating a predicting value of a second position information according to a correct value of a first position information at the first stage to access the memory blocks of the corresponding position in the memory; and a determining unit, coupled to the prediction unit, for identifying whether the correct value of a second position information is the same as the predicting value of the second position information at the second stage or not; where the first stage occurs before the second stage in a same data processing procedure.

These and other objectives of the present invention will no doubt become obvious to those of ordinary skill in the art after reading the following detailed description of the preferred embodiment that is illustrated in the various figures and drawings.

DETAILED DESCRIPTION

For improving the efficiency of data accessing and reducing power consumption, the present invention provides a method and apparatus for predicting memory access in the system mentioned above, for solving the problems associated with the prior art in order to improve overall efficiency and performance.

Figure 2:
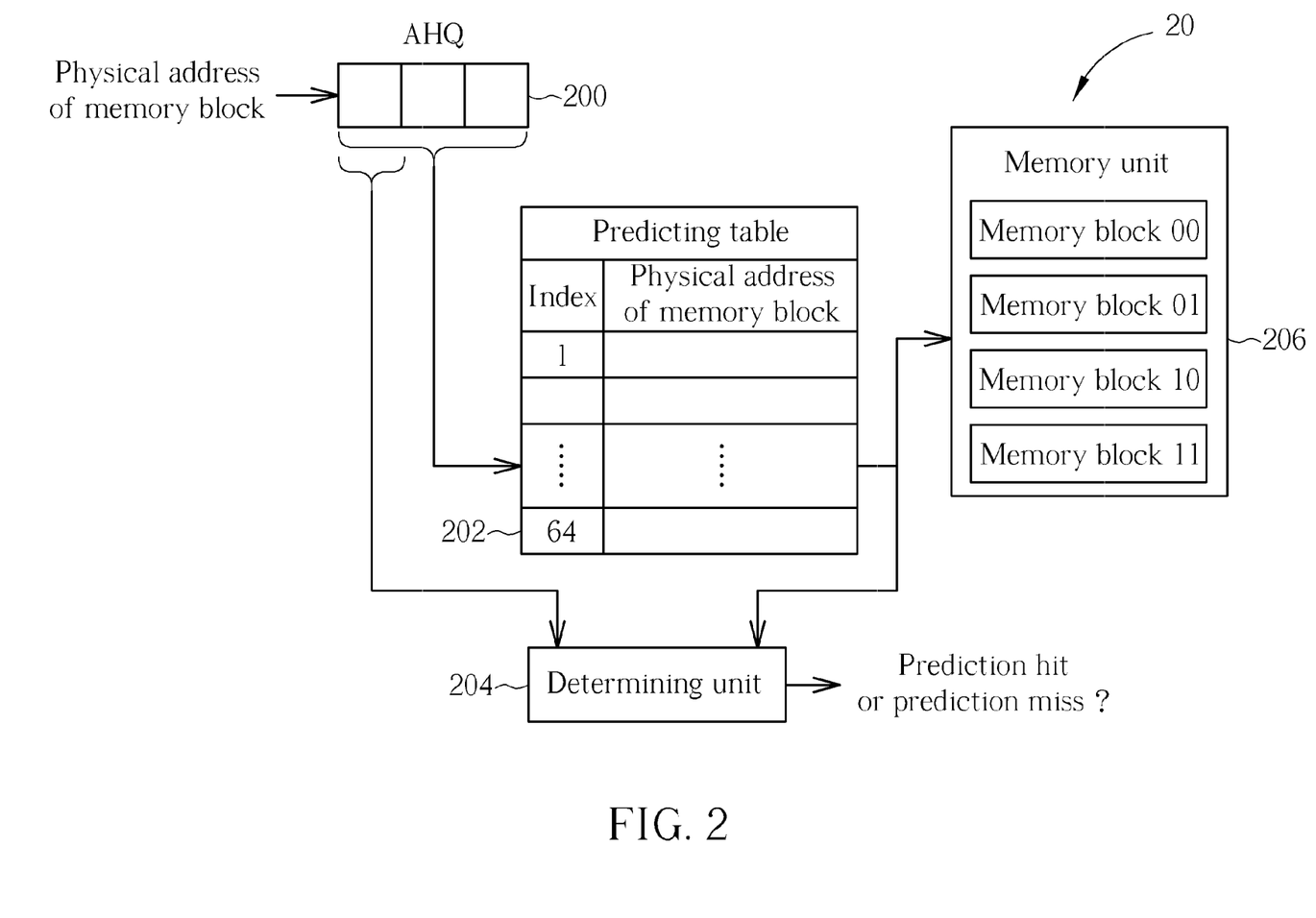
FIG. 2 is a diagram of a predicting memory access apparatus according to an exemplary embodiment of the present invention.

Please refer to FIG. 2. FIG. 2 is a diagram illustrating an exemplary embodiment of a predicting memory access apparatus 20. The apparatus 20 comprises: an access history queue (AHQ) 200, a prediction table 202, a determining unit 204 and a memory unit 206.

In an embodiment, the memory unit 206 is divided into a plurality of memory blocks. It is assumed here that the memory unit 206 is divided into four memory blocks, which are memory block 1, memory block 2, memory block 3 and memory block 4. As the memory unit 206 is divided into four memory blocks, the physical address of the memory block received each time by the AHQ 200 is capable of being represented by 2 bits only, and a 6-bit first in first out (FIFO) register is adopted to implement the AHQ 200; that is, only three physical addresses of the memory blocks are stored. The prediction table 202 is divided into 64 ($2^6$=64) entries according to the bit numbers of the AHQ 200, and each entry is for storing a physical address of a memory block.

Figure 3:
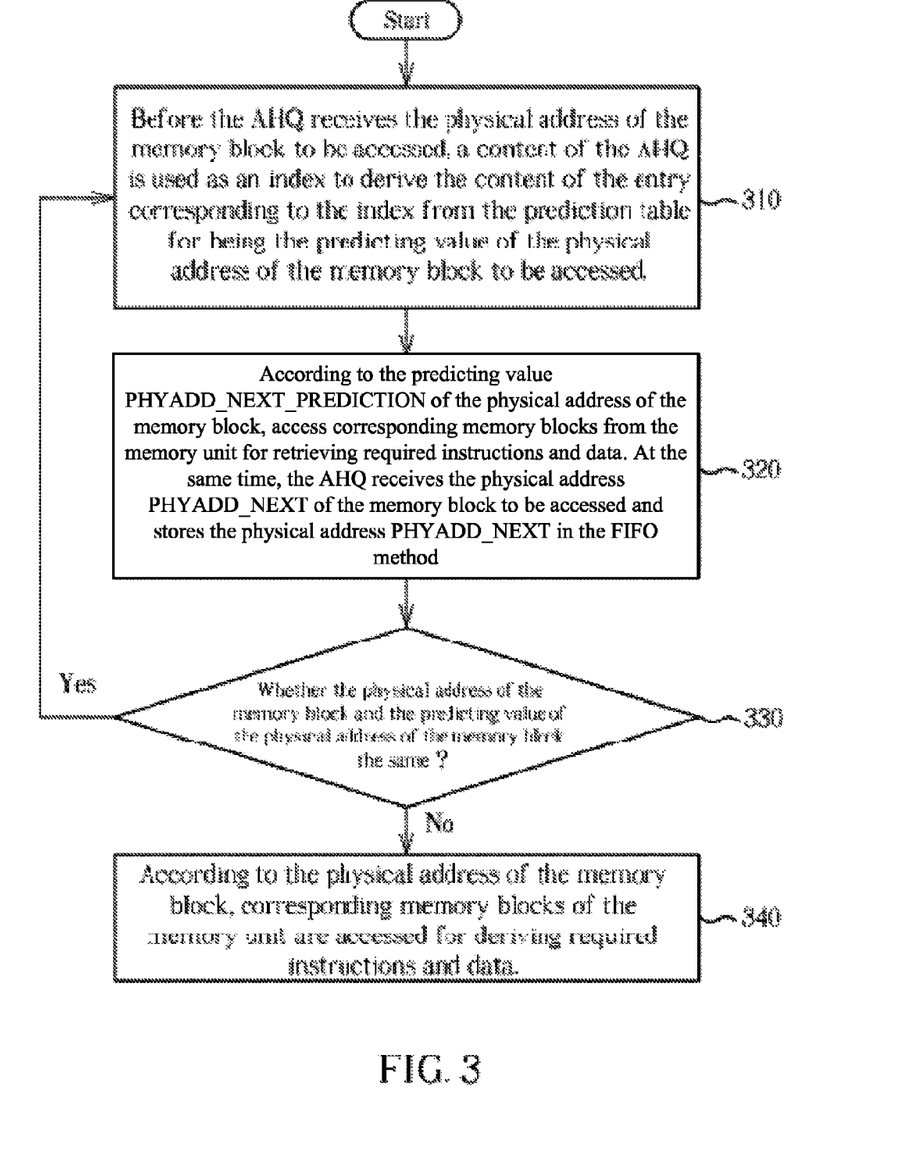
FIG. 3 is a diagram of a predicting memory access apparatus applied to the data processing system according to an exemplary embodiment of the present invention.

For better understanding, the physical address of the memory block to be accessed here is represented as PHYADD_NEXT, and the predicting value of the physical address of the memory block to be accessed is represented as PHYADD_NEXT_PREDICTION. Please refer to FIG. 3. FIG. 3 is a flowchart illustrating an exemplary embodiment of a predicting memory access according to the present invention. The steps are as follows:

STEP 310: Before the AHQ 200 receives the physical address PHYADD_NEXT of the memory block to be accessed, a 6-bit data of the AHQ 200 is used as an index to retrieve the content of the entry corresponding to the index from the prediction table 202 for being the predicting value PHYADD_NEXT_PREDICTION of the physical address of the memory block to be accessed.

STEP 320: According to the predicting value PHYADD_NEXT_PREDICTION of the physical address of the memory block, corresponding memory blocks from the memory unit 206 are accessed for retrieving required instructions and data. At the same time, the AHQ 200 receives the physical address PHYADD_NEXT of the memory block to be accessed and stores the physical address PHYADD_NEXT in the FIFO method.

STEP 330: The determining unit 204 compares the physical address PHYADD_NEXT of the memory block with the predicting value PHYADD_NEXT_PREDICTION of the physical address of the memory block. If the two addresses are the same, then the prediction is correct; if the two addresses are different, the prediction is wrong, and the flow proceeds to STEP 340.

STEP 340: According to the physical address PHYADD_NEXT of the memory block, corresponding memory blocks of the memory unit 206 are accessed for retrieving required instructions and data.

In another embodiment, the apparatus 20 further comprises an address generation module, for generating the physical address PHYADD_NEXT of the memory block in the AHQ 200. This is for illustration purposes only and is not intended as a limitation of the present invention.

Figure 4:
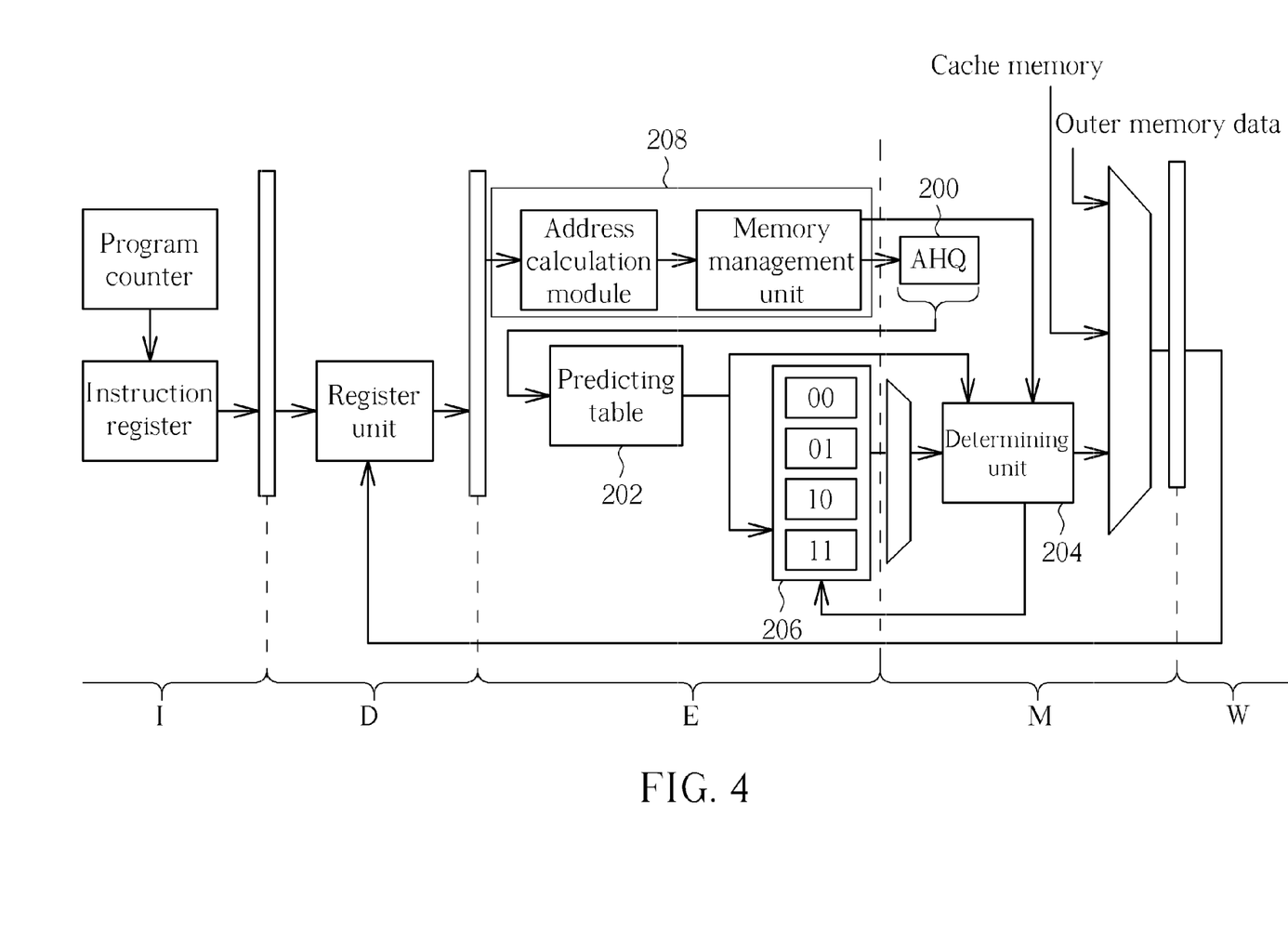
FIG. 4 is a flow chart of a predicting memory access method according to an exemplary embodiment of the present invention.

Please refer to FIG. 4. FIG. 4 is a diagram illustrating an exemplary embodiment of a predicting memory access apparatus 20 operated in the data processing system 10. In an embodiment, the apparatus 20 further comprises: an address calculation module 208 applied to a system having a pipeline mechanism. For each data processing procedure, the pipeline mechanism is performed in the following stages: Instruction fetch (I), Decode (D), Execution (E), Memory access (M), Write back (W) etc. Five stages are shown here, but this is for illustration purposes only and is not intended as a limitation of the present invention. The number of stages can be altered according to practical applications.

Figure 5:
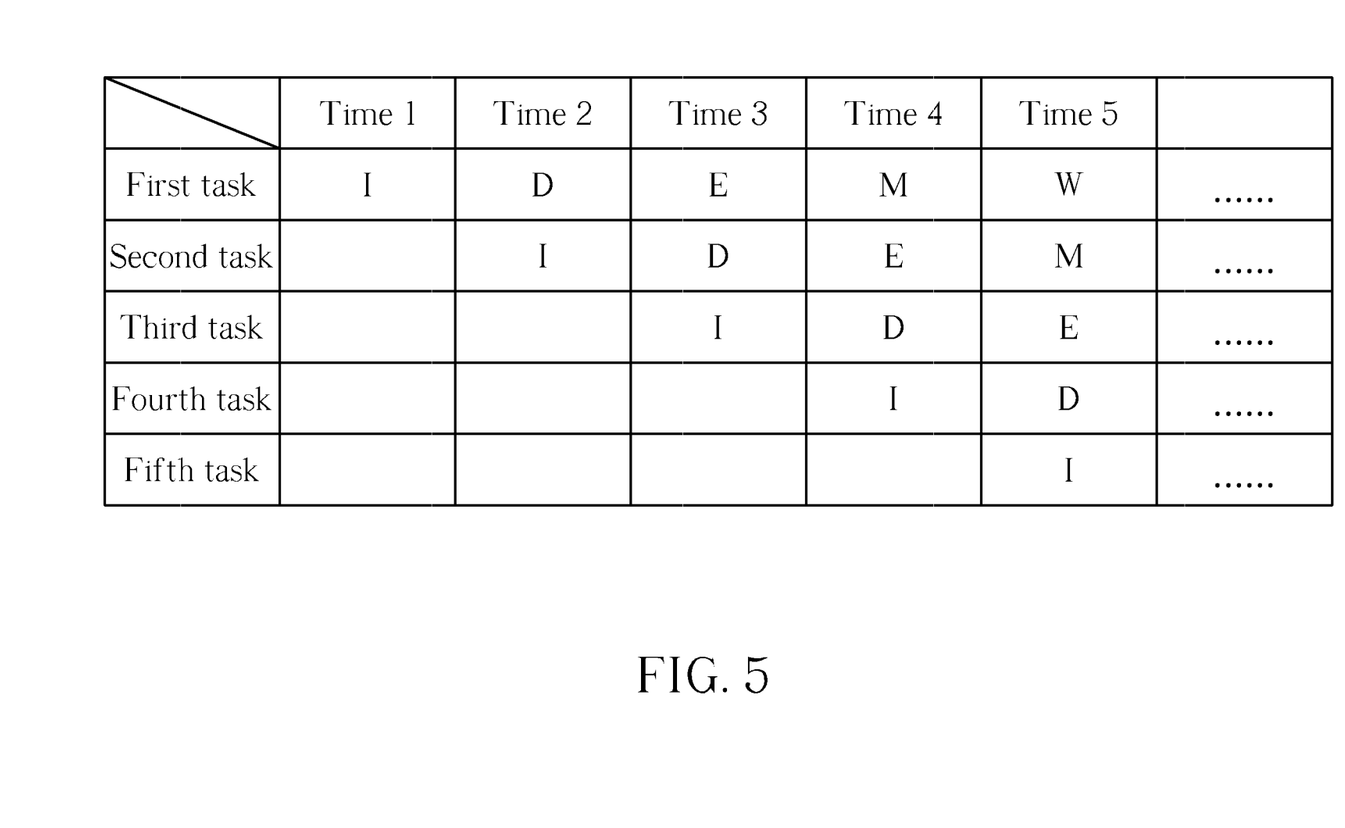
FIG. 5 is a diagram of a predicting memory access apparatus processed in a pipeline processing of a data processing system according to an exemplary embodiment of the present invention.

The pipeline mechanism is further outlined here for better illustration and understanding. It is assumed that the data processing system 10 has five tasks that need to be processed: task1, task2, task3, task4 and task5. During the execution of task1, the corresponding instructions are retrieved in the I stage; then, when task1 performs decoding of instructions at the D stage, task2 derives the corresponding instructions at the I stage at the same time; then, task1 performs corresponding operations according to the result derived from the I stage at the E stage, and task2 performs decoding of instructions at the D stage, task3 derives the instructions needed at the I stage at the same time; then, task1 derives the data needed from memories at the M stage, task2 performs corresponding operations according to the result derived from the D stage at the E stage; task3 performs decoding of the instructions at the D stage, task4 derives the corresponding instructions needed at the I stage at the same time; then, task1 stores the data to the memories at the W stage, task 2 derives the data needed from memories at the M stage, task3 performs corresponding operations according to the result derived from the D stage at the E stage; task4 performs decoding of the instructions at the D stage, task5 derives the corresponding instructions at the I stage at the same time; others and so forth according to the pipeline process. Please refer to FIG. 5 for a clearer illustration of the entire process.

Further illustration of an exemplary embodiment of a predicting memory access apparatus mentioned above is detailed herein. At the E stage, the address calculation module 208 generates a virtual address according to the task of the system, and converts the virtual address to a physical address. At the same time, the predicting memory access apparatus 20 of this invention performs accessing in advance of the memory blocks to be accessed according to AHQ 200 and prediction table 202. At the M stage, it is determined whether a prediction hit occurs or a prediction miss occurs, then the method of predicting memory access mentioned in FIG. 3 is performed. The related operations of other stages are omitted herein for brevity.

When memory blocks are accessed as described above, corresponding memory blocks of the memory 206 are started only according to the physical address, and other memory blocks are all closed. Therefore, when a prediction hit occurs, the memory block corresponding to the predicting value PHYADD_NEXT_PREDICTION of the physical address of the memory block is started; when a prediction miss occurs, the two memory blocks corresponding to the predicting value PHYADD_NEXT_PREDICTION and the physical address PHYADD_NEXT of the memory blocks are started only. Thus, the present invention not only reduces the power consumption but also improves the overall performance of the present invention. Please note that this example is for illustration purposes only and is not intended as a limitation of the present invention.

It should be noted that, in the embodiment mentioned above, the memory 206 is implemented by a tightly coupled memory (TCM), but this is for illustration purposes only and is not intended as a limitation of the present invention. The prediction mechanism mentioned above is capable of being applied to other kinds of memories, but corresponding descriptions are omitted herein for brevity.

Figure 6:
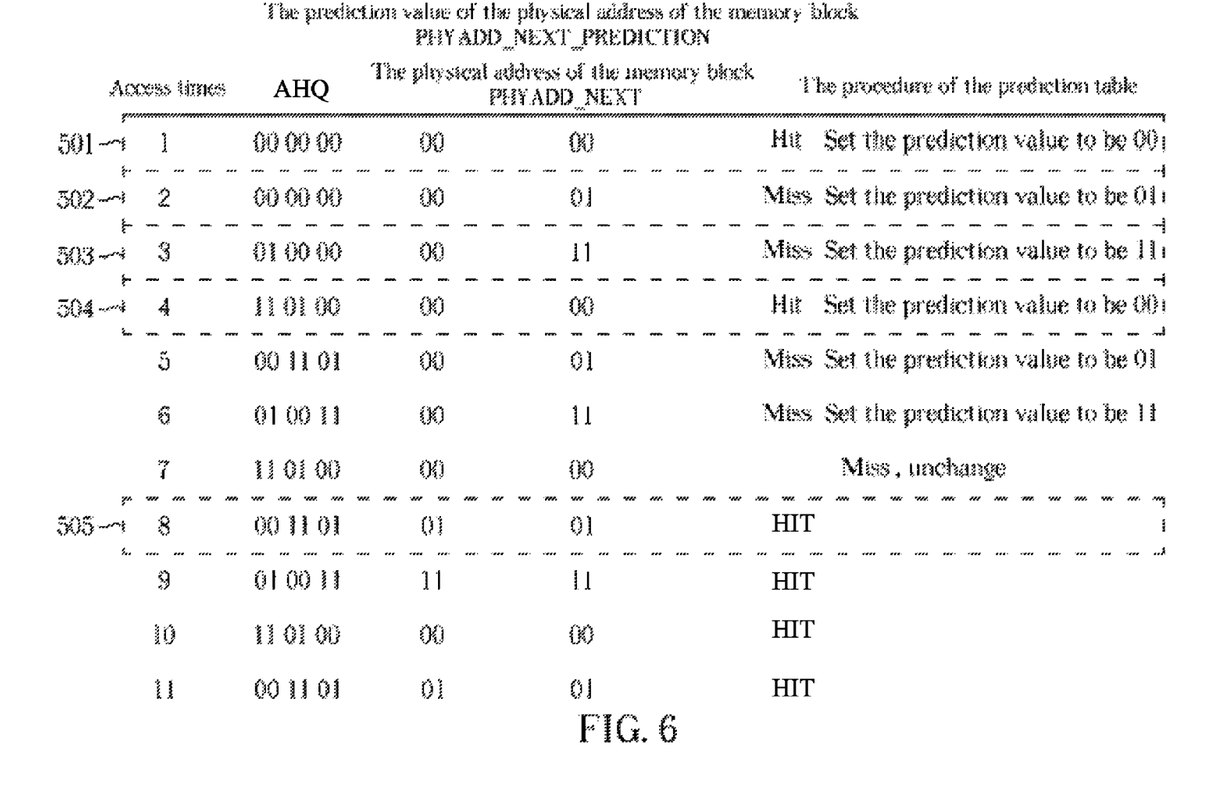
FIG. 6 is a diagram of predicting memory access according to an exemplary embodiment of the present invention.
Figure 7:
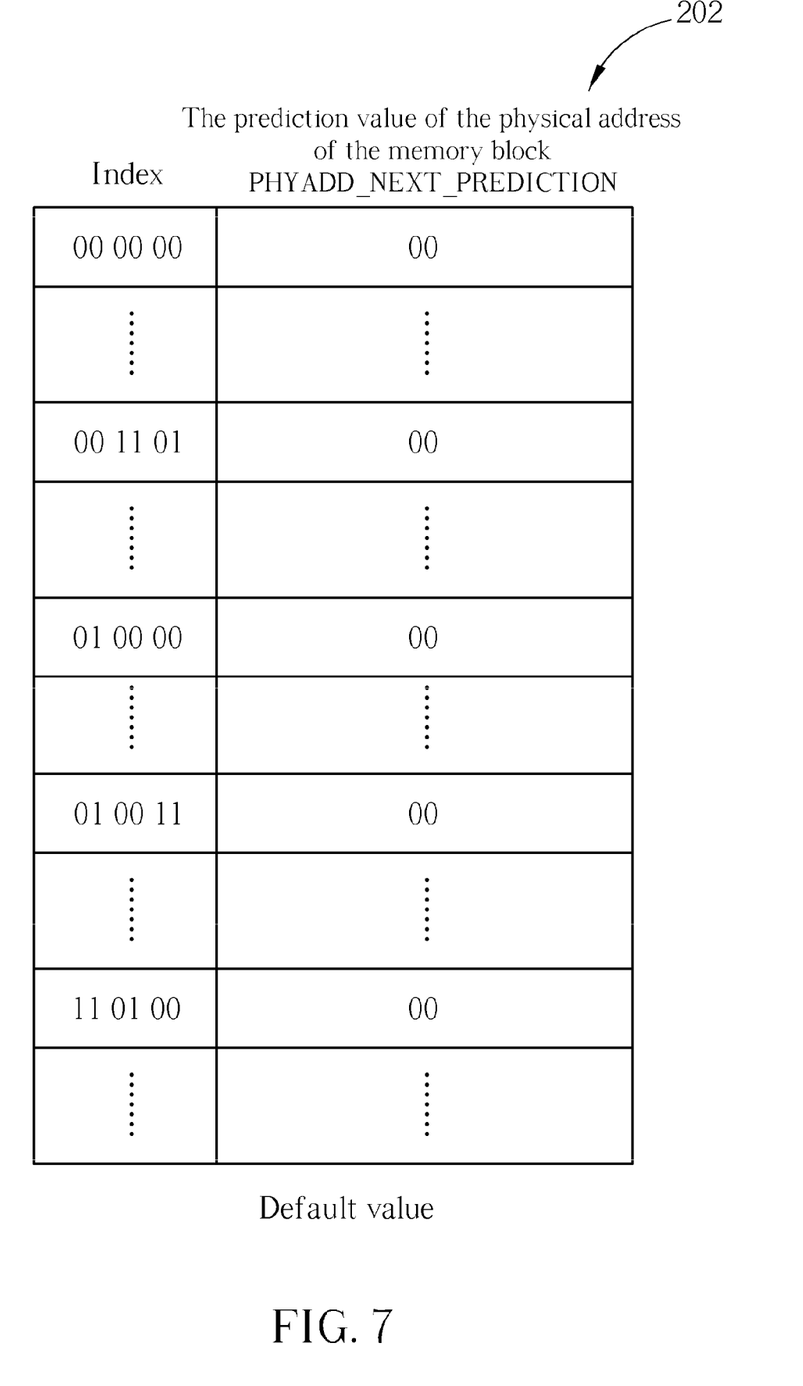
FIG. 7~FIG. 12 are diagrams of a content of the prediction table of predicting memory access according to an exemplary embodiment of the present invention.
Figure 8:
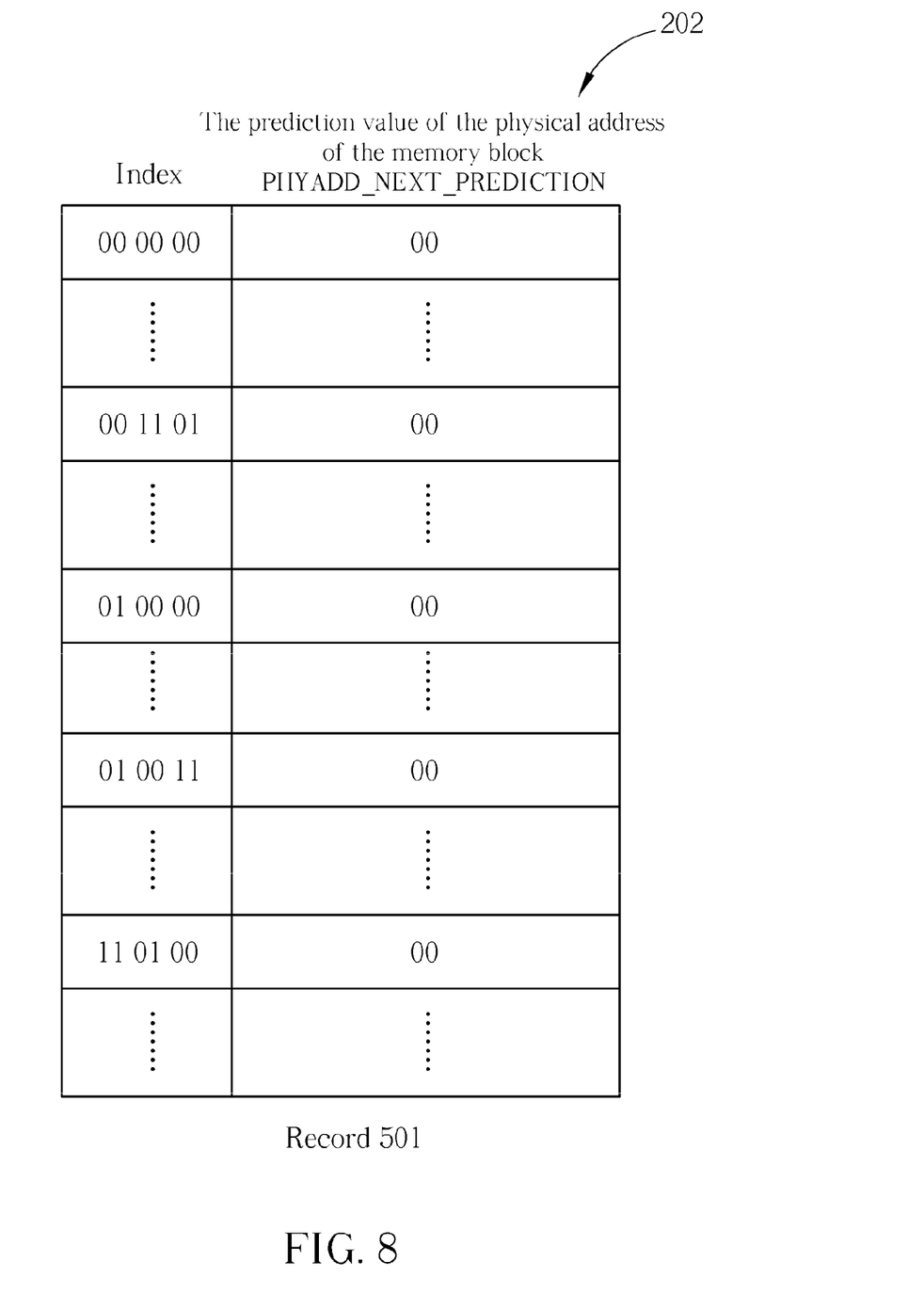
Figure 9:
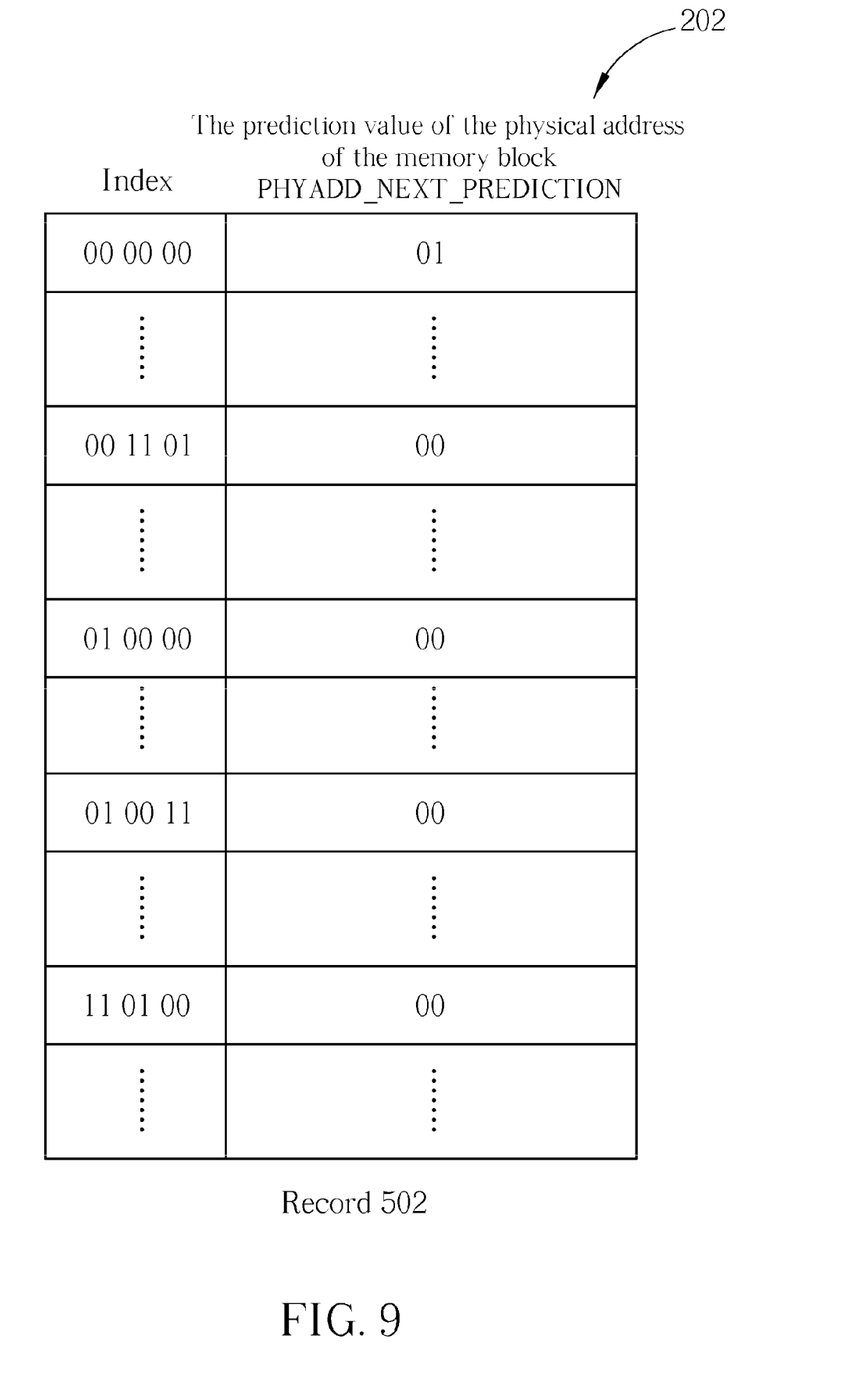
Figure 10:
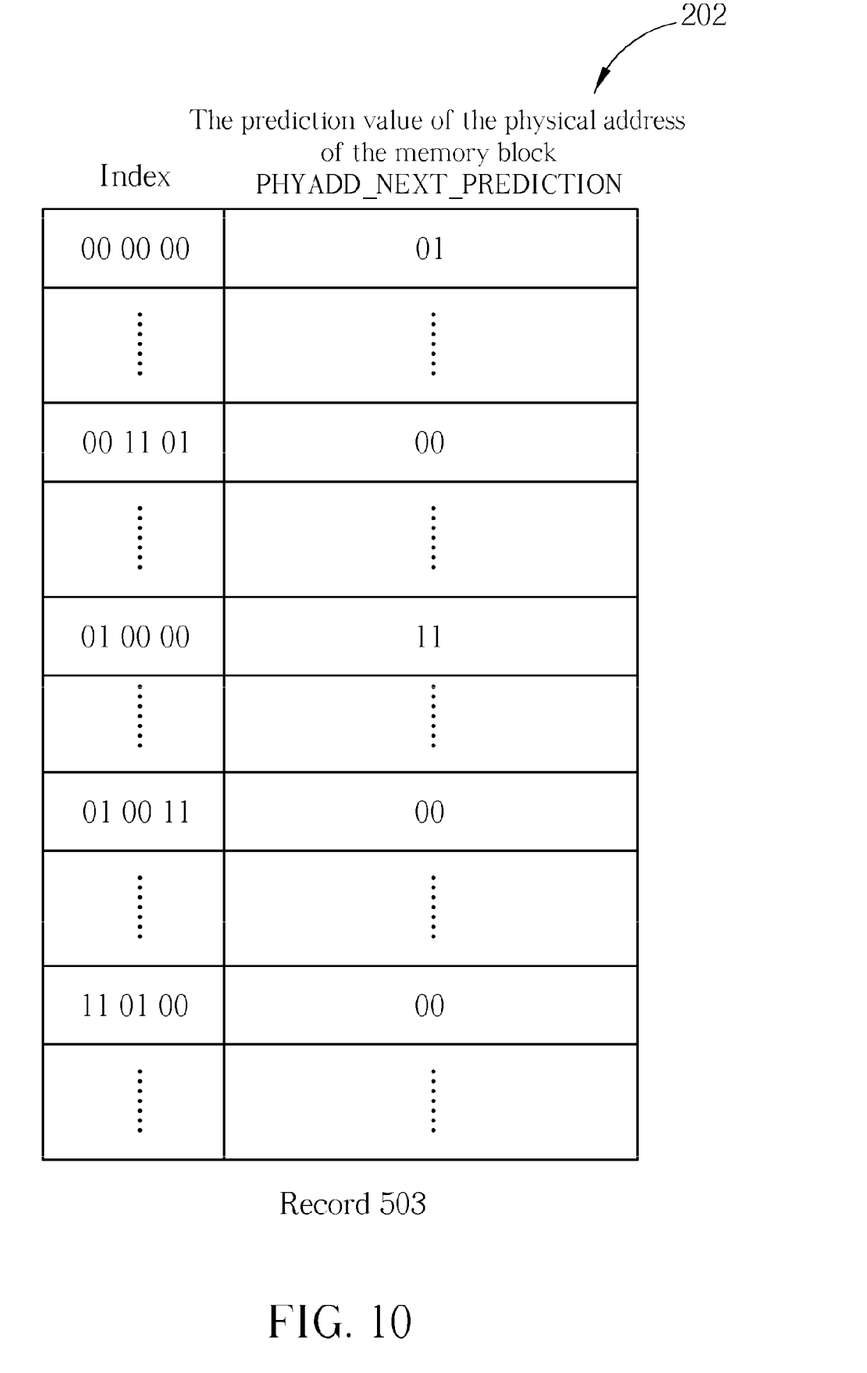
Figure 11:
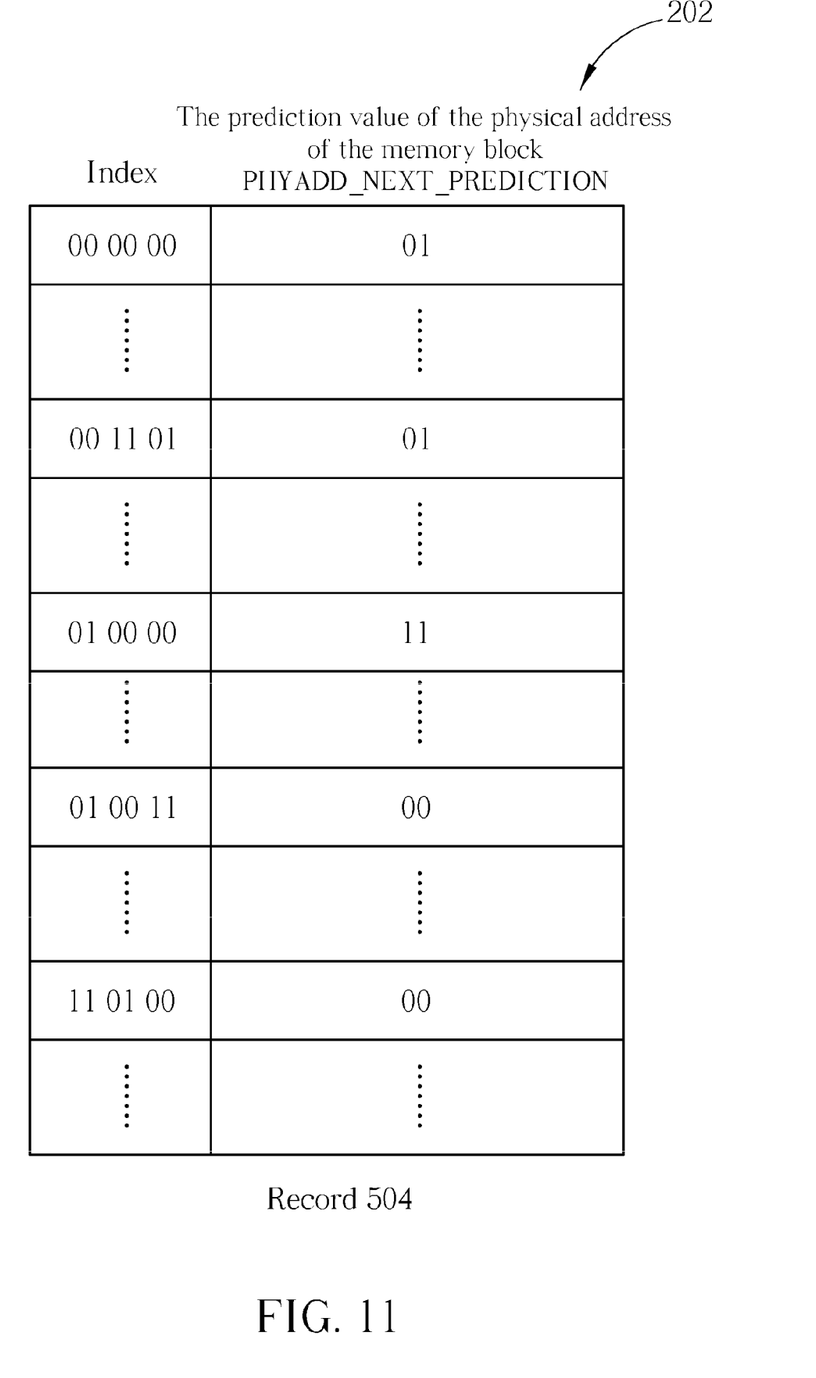
Figure 12:
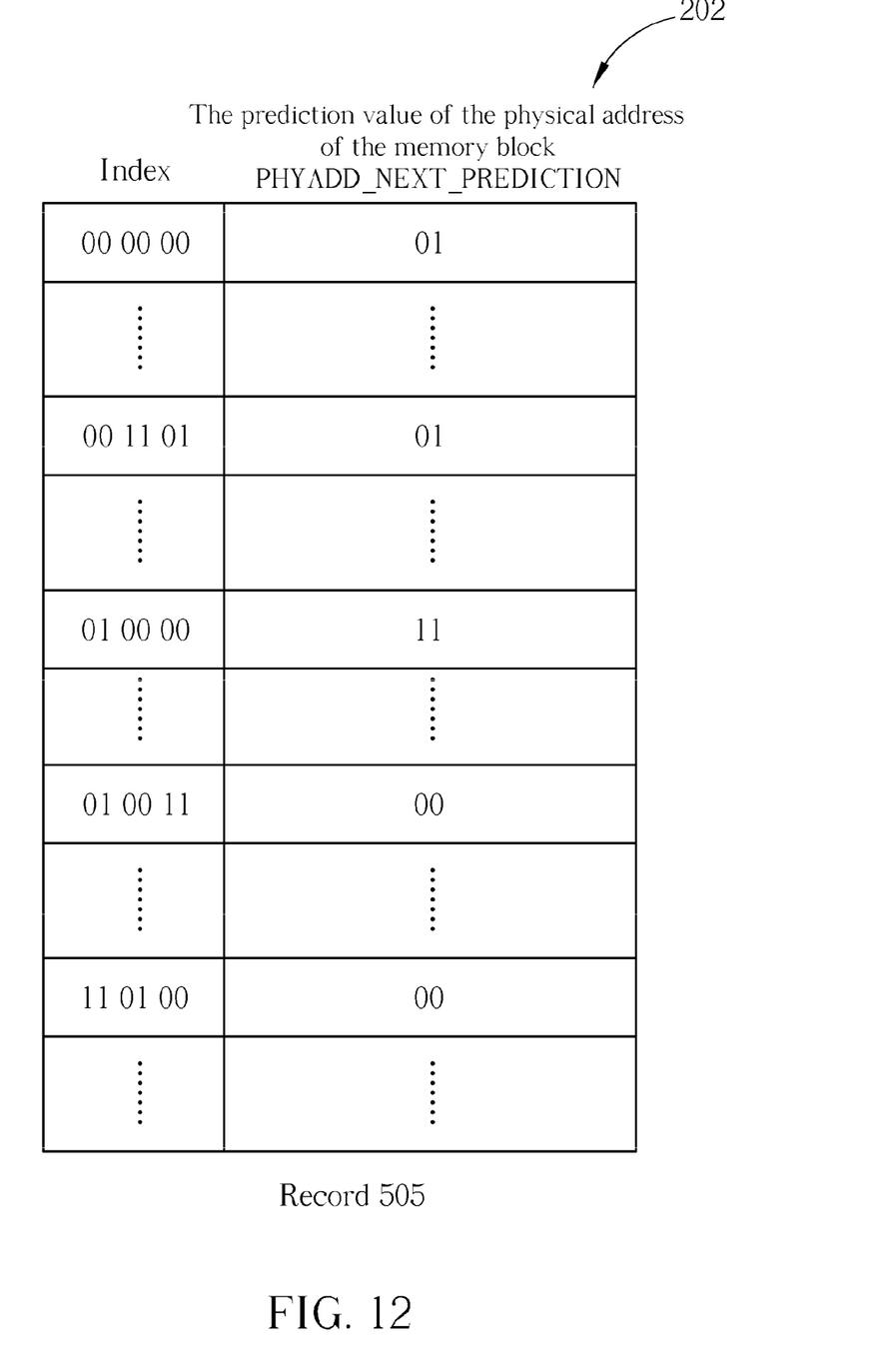

Please refer to FIG. 2 and FIGS. 6 to 12. FIG. 6 is a diagram illustrating an exemplary embodiment of predicting memory access and FIG. 7 to FIG. 12 are diagrams illustrating a prediction table of an exemplary embodiment of predicting memory access. Please refer to FIG. 6 and FIG. 7 first. The content of the AHQ 200 and the content of the prediction table 202 are all default values, where the bit sequence is "$B_5B_4B_3B_2B_1B_0$" representing that the physical addresses of the memory blocks accessed in sequence are "$B_1B_0$", "$B_3B_2$" and "$B_5B_4$". In the record 501, the AHQ 200 is the combination of the access sequence "000000", and the prediction value PHYADD_NEXT_PREDICTION of the physical address of the memory block is derived from the index address "000000" and the default value "00" of the index address "000000" of the prediction table 202 of FIG. 7, then accessing in advance of the memory block of the physical address "00" is performed. Here, the physical address PHYADD_NEXT of the memory block to be accessed is also "00" (please refer to FIG. 6), so it represents a prediction hit occurs. Additionally, the physical address PHYADD_NEXT "00" of the memory block uploads "$B_5B_4$" to the AHQ 200 in the FIFO, and the default content of the index address "000000" of the prediction table 202 is set to be "00" (please refer to FIG. 8); then, the second memory access is performed (please refer to FIG. 6 and FIG. 8), as shown in the record 502. The AHQ 200 is still "000000", and accessing of the prediction table 202 is still performed according to the content of the AQH 200, where the content of the AQH 200 is the index, and the default content of the index address "000000" of the prediction table 202 of the FIG. 8 is "00", so the prediction value PHYADD_NEXT_PREDICTION of the physical address of the memory block this time is "00", and accessing in advance of the physical address being "00" of the memory block is performed, but the physical address PHYADD_NEXT of the memory block to be accessed is "01" (please refer to FIG. 6), which represents a prediction miss occurs. Therefore, accessing of the physical address "01" of the memory block should be performed to derive correct instructions and data. Additionally, "$B_5B_4$" is uploaded to the AHQ 300 in the FIFO method, and the default content of the index address "000000" of the prediction table 202 is set to be "01" (please refer to FIG. 9); then, the third memory accessing is performed (please refer to FIG. 6 and FIG. 9), as shown in the record 503, the AHQ 200 is "010000", and accessing of the prediction table 202 is still performed according to the content of the AQH 200, where the content of the AQH 200 is the index, and the default content of the index "010000" of the prediction table 202 of the FIG. 9 is "00", so the prediction value PHYADD_NEXT_PREDICTION of the physical address of the memory block this time is "00", and therefore accessing in advance of the physical address being "00" of the memory block is performed, which represents a prediction miss occurs, therefore, accessing of the physical address "11" of the memory block should be performed to derive correct instructions and data. Additionally, the physical address PHYADD_NEXT "11" of the memory block is uploaded to the "$B_5B_4$" of the AHQ 200 in the FIFO method, and the content of the AHQ 200 is "110100", and the content of the default value of the prediction table 202 is set to be "11" (please refer to FIG. 10); then, the third memory accessing is performed (please refer to FIG. 10). As shown in the record 504, the AHQ 200 is "110100", and still performs accessing of the prediction table 202 according to the content of the AQH 200, where the content of the AQH 200 is the index, and the content of the default value "110100" of the prediction table 202 of the FIG. 9 is "00", so the prediction value PHYADD_NEXT_PREDICTION of the physical address of the memory block this time is "00", so accessing in advance of the physical address "00" of the memory block is performed, and the physical address PHYADD_NEXT of the memory block to be accessed this time is "00" (please refer to FIG. 6), which represents a prediction hit occurs. Additionally, the physical address PHYADD_NEXT "00" of the memory block uploads the "$B_5B_4$" of the AHQ 200 in the FIFO method, and the content of the AHQ 200 now is "001101", and the content of the default value of the index address "110100" is set to be "00" (please refer to FIG. 11; here, the record 505 shows that the content of the AHQ 200 is "001101", and still accessing of the prediction table 202 according to the content of the AQH 200 is still performed, where the content of the AQH 200 is the index, and the content of the index address "001101" of the prediction table 202 of the FIG. 11 is "01", so the prediction value PHYADD_NEXT_PREDICTION of the physical address of the memory block this time is "01", so accessing in advance of the physical address "01" of the memory block is performed. The physical address PHYADD_NEXT of the memory block to be accessed this time is "01" (please refer to FIG. 6), which represents a prediction hit occurs, additionally, the physical address PHYADD_NEXT "01" of the memory block uploads the "$B_5B_4$" of the AHQ 200 in the FIFO method, and the content of the AHQ 200 now is "010011", but the content of the index address "001101" is already set to be "01" (please refer to FIG. 12), so does not need to be set again.

From the above it can be seen that the next memory block to be accessed is capable of being predicted precisely through proper procedures to construct the prediction table 202. Please note that, in this embodiment, the AQH 200 only records three continuous physical addresses of the memory block, but this is for illustration purposes only and is not intended as a limitation of the implement method of the prediction table 202.

Those skilled in the art will readily observe that numerous modifications and alterations of the apparatus and method may be made while retaining the teachings of the invention.

What is claimed is:
1. A method for predicting memory access, where each data processing procedure is performed in a plurality of stages, and the plurality of stages comprise at least a first stage and a second stage, the method comprising:
   dividing a memory into a plurality of memory blocks;
   generating a predicting value of a second physical address according to a correct value of a first physical address at the first stage, wherein generating the predicting value comprises storing, in an access history queue (AHQ) unit, the correct value of the first physical address, wherein the predicting value of the second physical address is generated by accessing a prediction unit according to an oldest entry in the AHQ unit;
   accessing a corresponding memory block of the memory blocks according to the predicting value of the second physical address; and
   identifying whether the predicting value of the second physical address is correct or not for determining whether the memory is re-accessed or not;
   wherein the first stage occurs before the second stage in a same data processing procedure.

2. The method of claim 1, wherein the step of identifying whether the predicting value of the second physical address is correct or not, further comprises:
   generating a correct value of a second physical address; and
   identifying whether the correct value of the second physical address is the same as the predicting value of the second physical address.

3. The method of claim 2, wherein the step of identifying whether the correct value of the second physical address is the same as the predicting value of the second physical address further comprises:
   if the correct value of the second physical address is equal to the predicting value of the second physical address, a prediction hit occurs, and it is not necessary to access the memory blocks of the corresponding position in the memory according to the correct value of the second physical address at the second stage.

4. The method of claim 2, wherein the step of identifying whether the correct value of the second physical address is the same as the predicting value of the second physical address further comprises:

if the correct value of the second physical address differs from the predicting value of the second position, a prediction miss occurs, and it is necessary to access the memory blocks of the corresponding position in the memory according to the correct value of the second physical address at the second stage.

5. The method of claim 1, wherein the step of generating a predicting value of the second physical address at the first stage further comprises:

wherein the prediction unit comprises a plurality of registers, and wherein the contents of the registers are addresses of the memory blocks.

6. The method of claim 2, further comprising:

updating the content of a registry corresponding to the index with the correct value of the second physical address at the second stage.

7. The method of claim 1, wherein a memory access queue is stored in a FIFO register.

8. The method of claim 1, wherein the memory is a tightly coupled memory (TCM).

9. An apparatus for predicting memory access, wherein each data processing procedure is performed in a plurality of stages with segment processing, and the plurality of stages comprise at least a first stage and a second stage, the apparatus comprising:

a memory, comprising a plurality of memory blocks;
a prediction unit, coupled to the memory, for generating a predicting value of a second physical address according to a correct value of a first physical address at the first stage to access the memory blocks of the corresponding position in the memory, wherein generating the predicting value comprises storing, in an access history queue (AHQ) unit, the correct value of the first physical address, wherein the predicting value of the second physical address is generated by accessing the prediction unit according to an oldest entry in the AHQ unit; and
a determining unit, coupled to the prediction unit, for identifying whether the correct value of the second physical address is the same as the predicting value of the second physical address or not;
wherein the first stage occurs before the second stage in a same data processing procedure.

10. The apparatus of claim 9, wherein if the correct value of the second physical address equals the predicting value of the second position in the same data processing procedure, then it is not necessary to access the memory blocks of the corresponding position in the memory according to the correct value of the second physical address at the second stage to derive the data needed.

11. The apparatus of claim 9, wherein the correct value of the second physical address is for generating a predicting value of a third physical address at the first stage in the next data processing procedure.

12. The apparatus of claim 9, wherein the prediction unit further comprises:

a plurality of registries, for storing at least a physical address of a memory block.

13. The apparatus of claim 10, wherein if the correct value of the second physical address equals the predicting value of the second position at the second stage, then a prediction hit occurs, and if the correct value of the second physical address differs from the predicting value of the second position at the second stage, then a prediction miss occurs.

14. The apparatus of claim 10, wherein when a prediction miss occurs, then the memory blocks of the corresponding position in the memory are accessed according to the correct value of the second physical address at the second stage to derive the correct data needed.

15. The apparatus of claim 12, wherein the content of the registry corresponding to the index is updated with the correct value of the second physical address at the second stage.

16. The apparatus of claim 10, wherein the AHQ unit is a FIFO register.

17. The apparatus of claim 9, wherein the memory is a tightly coupled memory (TCM).

18. A method implemented in a multi-stage pipeline for predicting memory access, the method comprising:

predicting, by a predicting memory access apparatus, a next physical address within the memory to be accessed, wherein predicting the next physical address comprises retrieving content from a prediction unit according to an index stored in a first-in-first-out (FIFO) queue;
accessing the memory at the predicted next physical address to retrieve the stored content;
determining an actual physical address within the memory to be accessed; and
based on whether the predicted next physical address is the same as the determined actual physical address, bypassing a memory access at the determined actual physical address;
wherein the accessing operation is performed prior to the determining operation.

* * * * *